United States Patent
Evoy et al.

(10) Patent No.: US 6,839,862 B2
(45) Date of Patent: Jan. 4, 2005

(54) PARALLEL DATA COMMUNICATION HAVING SKEW INTOLERANT DATA GROUPS

(75) Inventors: David R. Evoy, Tempe, AZ (US); Timothy Pontius, Lake in the Hills, IL (US); Gregory E. Ehmann, Sleepy Hollow, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 616 days.

(21) Appl. No.: 09/871,159

(22) Filed: May 31, 2001

(65) Prior Publication Data

US 2002/0184552 A1 Dec. 5, 2002

(51) Int. Cl.⁷ .............................. G06F 1/04; G06F 1/12; G04L 7/00
(52) U.S. Cl. ........................ 713/503; 713/400; 713/600
(58) Field of Search ................................ 713/503, 600, 713/400, 500; 714/700

(56) References Cited

U.S. PATENT DOCUMENTS

| | | | | |
|---|---|---|---|---|
| 5,068,880 A | * | 11/1991 | Kline et al. | 375/368 |
| 5,425,020 A | * | 6/1995 | Gregg et al. | 370/252 |
| 5,799,175 A | | 8/1998 | Cassiday et al. | |
| 5,978,419 A | * | 11/1999 | Cassiday et al. | 375/257 |
| 6,324,503 B1 | * | 11/2001 | Manjunath et al. | 704/226 |
| 6,549,595 B1 | * | 4/2003 | Den Besten et al. | 375/360 |

FOREIGN PATENT DOCUMENTS

JP  57162119 A  * 10/1982  ............ G11B/5/43

OTHER PUBLICATIONS

IBM, Enhanced Means for Parallel Synchronization in Crossbar Switching Networks, Jun. 1, 1989, IBM Technical Disclosure Buttetin, vol. 32, Issue 1, pp. 281–283.*

* cited by examiner

*Primary Examiner*—Thomas Lee
*Assistant Examiner*—Suresh Suryawanshi
(74) *Attorney, Agent, or Firm*—Peter Zawilski

(57) ABSTRACT

In one example embodiment, a high-speed parallel-data communication approach transfers digital data in parallel from a first module to a second module over a communication channel including a plurality of parallel data-carrying lines and a clock path. The parallel bus lines are arranged in a plurality of groups, each of the groups including a plurality of data-carrying lines and a clock path adapted to carry a clock signal for synchronizing digital data carried from the first module to the second module. The sets of data are concurrently transferred using the groups of lines of the parallel bus, and at the second module and for each group, the transferred digital data is synchronously collected via the clock signal for the group. At the second module, the data collected for each group is aligned. By grouping the bus lines in groups with each group having its own clock domain, skew across clock-domain groups is tolerated and overcome by processing the data and the skew first within each clock domain group, and then between groups.

21 Claims, 6 Drawing Sheets

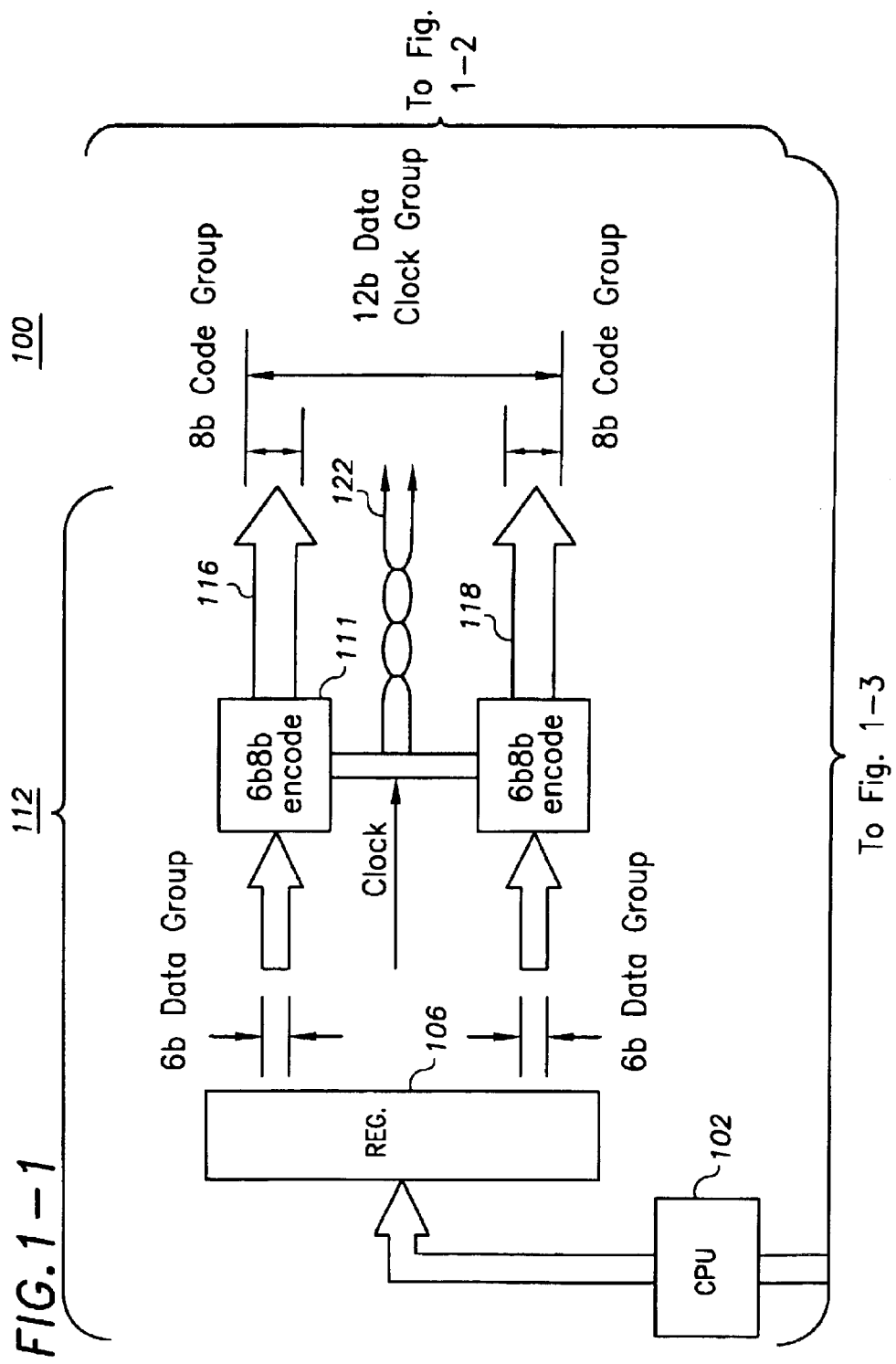

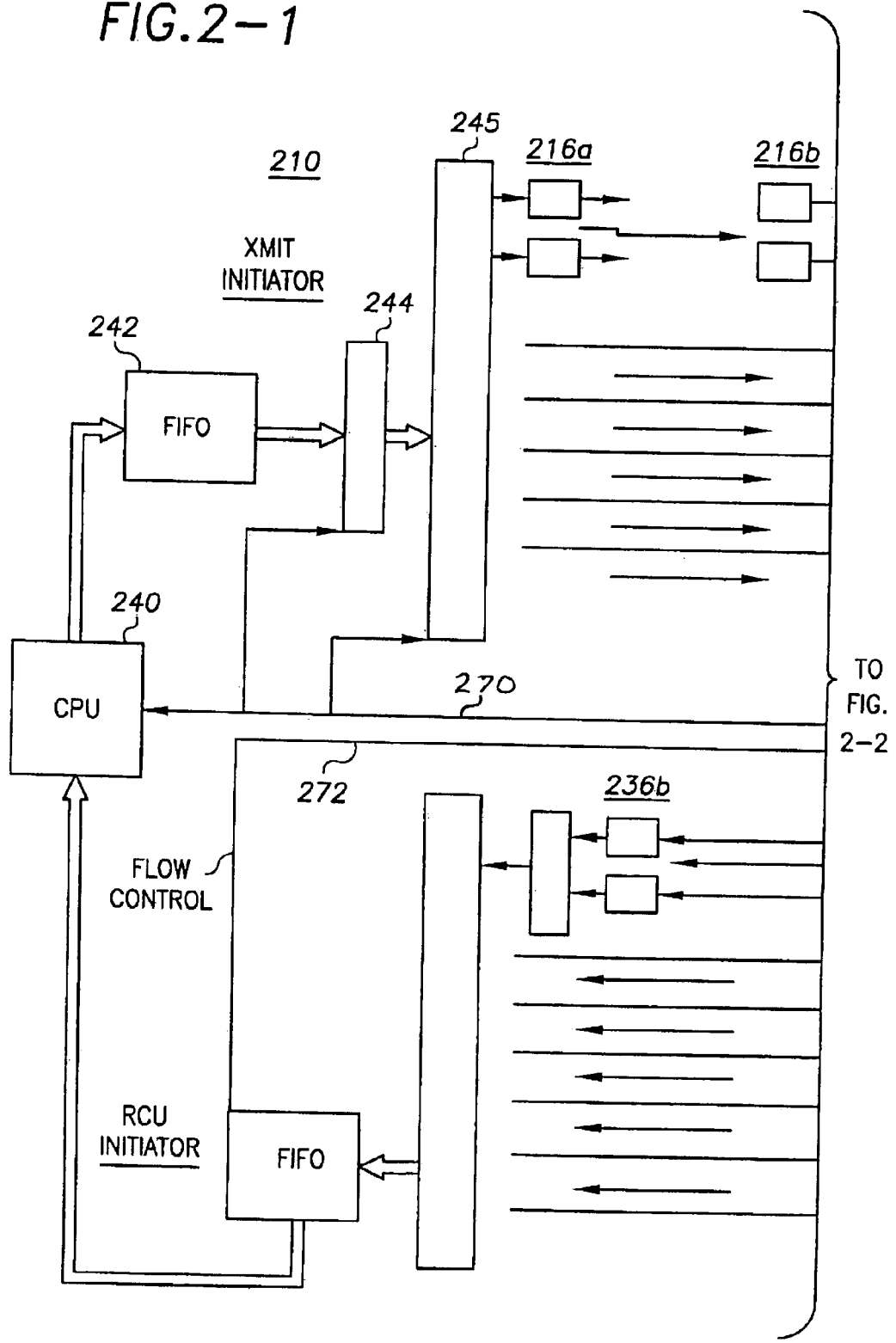

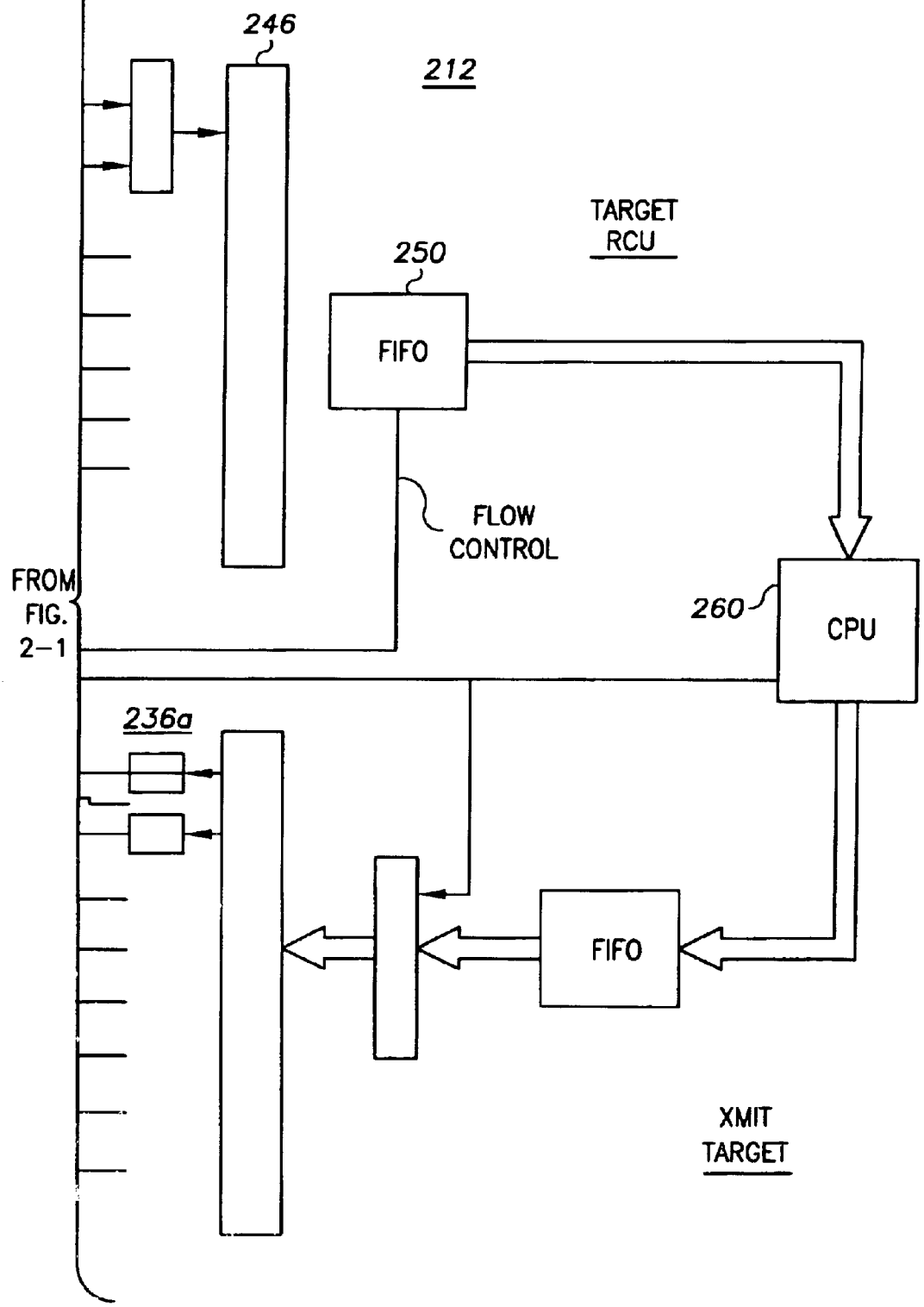

PARALLEL DATA COMMUNICATION HAVING SKEW INTOLERANT DATA GROUPS

RELATED PATENT DOCUMENTS

The present invention is related to and fully incorporates the subject matter disclosed in concurrently-filed U.S. patent application Ser. No. 09/871,197, entitled "Parallel Communication Based On Balanced Data-Bit Encoding" (VLSI.295PA), Ser. No. 09/871,160, entitled "Parallel Data Communication Consuming Low Power" (VLSI.299PA), and Ser. No. 09/871,117, entitled "Parallel Data Communication Having Multiple Sync Codes" (VLSI.312PA).

FIELD OF THE INVENTION

The present invention is directed generally to data communication. More particularly, the present invention relates to methods and arrangements for reducing skew errors in data signals transmitted on parallel data bus lines.

BACKGROUND OF THE INVENTION

The electronics industry continues to strive for high-powered, high-functioning circuits. Significant achievements in this regard have been realized through the development of very large-scale integrated circuits. These complex circuits are often designed as functionally-defined modules that operate on a set of data and then pass that data on for further processing. This communication from such functionally-defined modules can be passed in small or large amounts of data between individual discrete circuits, between integrated circuits within the same chip, and between remotely-located circuits coupled to or within various parts of a system or subsystem. Regardless of the configuration, the communication typically requires closely-controlled interfaces that are designed to ensure that data integrity is maintained while using circuit designs are sensitive to practicable limitations in terms of implementation space and available operating power.

The increased demand for high-powered, high-functioning semiconductor devices has lead to an ever-increasing demand for increasing the speed at which data is passed between the circuit blocks. Many of these high-speed communication applications can be implemented using parallel data transmission in which multiple data bits are simultaneously sent across parallel communication paths. Such "parallel bussing" is a well-accepted approach for achieving data transfers at high data rates. For a given data-transmission rate (sometimes established by a clock passed along with the data), the bandwidth, measured in bits-per-second, is equivalent to the data transmission rate times the number of data signals comprising the parallel data interconnect.

A typical system might include a number of modules that interface to and communicate over a parallel data communication line (sometimes referred to as a data channel), for example, in the form of a cable, a backplane circuit, a bus structure internal to a chip, other interconnect, or any combination of such communication media. A sending module transmits data over the bus synchronously with a clock on the sending module. In this manner, the transitions on the parallel signal lines leave the sending module in a synchronous relationship with each other and/or to a clock on the sending module. At the other end of the parallel data interconnect, the receiving module receives the data on the parallel data bus; where the communication arrangement passes a clock signal, the receive clock is typically derived from or is synchronous with the clock on the sending module. The rate at which the data is passed over the parallel signal lines is sometimes referred to as the (parallel) "bus rate."

In such systems, it is beneficial to ensure that the received signals (and where applicable, the receive clock) has a specific phase relationship to the transmit clock to provide proper data recovery. There is often an anticipated amount of time "skew" between the transmitted data signals themselves and between the data signals and the receive clock at the destination. There are many sources of skew including, for example, transmission delays introduced by the capacitive and inductive loading of the signal lines of the parallel interconnect, variations in the I/O (input/output) driver source, intersymbol interference and variations in the transmission lines' impedance and length. Regardless of which phenomena cause the skew, achieving communication with proper data recovery, for many applications, should take this issue into account.

For parallel interconnects serving higher-speed applications, in connection herewith it has been discovered that skew is "pattern dependent" and that the severity of this issue can be mitigated and, in many instances, largely overcome. As described in the above-referenced patent document entitled "Parallel Communication Based On Balanced Data-Bit Encoding" (VLSI.295PA), this pattern dependency results from the imperfect current sources shared between the data bits in the parallel bus. The shared current sources induce skew at the driver, which directly reduces margin at the receiver, which in turn can cause data transmission errors.

Many of these high-speed parallel communication applications require the parallel transmission of many bits of data and, therefore require the use of a corresponding number of parallel-bus data lines. Typically, the greater the number of data bits (or parallel-bus data lines), the more difficult it is to prevent unacceptable levels of skew across all the bits. With increasing transmission rates, this difficulty is a bottleneck to the number of useful parallel-bus data lines.

Accordingly, there is a need to improve data communication over parallel busses, which would lead to more practicable and higher-speed parallel bussing of data which, in turn, would permit higher-powered, higher-functioning circuits that preserve data integrity and are sensitive to such needs as reducing implementation space and power consumption.

SUMMARY OF THE INVENTION

Various aspects of the present invention are directed to data transfer over parallel-communication line circuits in a manner that addresses and overcomes the above-mentioned issues and can be used in conjunction with the embodiments disclosed in the above-mentioned patent documents.

Consistent with one example embodiment, the present invention is directed to a method of transferring digital data from a first module to a second module over a parallel bus having parallel bus lines that would be susceptible to skewing data carried by the bus. The method includes: arranging the parallel bus lines in a plurality of groups, each of the groups including a plurality of data-carrying lines and a clock path adapted to carry a clock signal for synchronizing digital data carried from the first module to the second module over the plurality of data-carrying lines of the group. Sets of data are passed concurrently on the plurality of groups of bus lines. Then, at the second module and for each group, the passed digital data is synchronously collected by the clock signal for the group, and the collected data for each group is aligned and any skew-caused misalignments between data concurrently transferred in different groups are overcome.

In applications involving a high-speed data transfer over a parallel data circuit, various example embodiment of the present invention are directed to tolerating data skew across a relatively large number of parallel bus lines by grouping the bus lines into individual clock domains and permitting only a small degree of data skew within each clock domain. Using FIFO buffers to collect the data collected from each group, the collected data is aligned from group to group to recreate the data originally sent over the bus. The approach overcomes more significant skew-caused misalignments between data concurrently transferred in different groups.

In one example embodiment, a high-speed parallel-data communication approach transfers digital data in parallel from a first module to a second module over a communication channel including a plurality of parallel data-carrying lines and a clock path. The parallel bus lines are arranged in a plurality of groups, each of the groups including a plurality of data-carrying lines and a clock path adapted to carry a clock signal for synchronizing digital data carried from the first module to the second module. The sets of data are concurrently transferred using the groups of lines from the parallel bus, and at the second module and for each group, the transferred digital data is synchronously collected via the clock signal for the group. At the second module, the data collected from each group is aligned. By grouping the bus lines in groups with each group having its own clock domain, the approach permits only a small degree of data skew within each group; and, by aligning the data collected from each group, the approach overcomes more significant skew-caused misalignments between data concurrently transferred in different groups.

Other example embodiments of the present invention are respectively directed to the encoding, decoding and system-processing aspects of such interfaces.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 2—1 through 2—2 are a diagram of another example parallel data communication line arrangement, also according to the present invention.

Figures 1, 2:
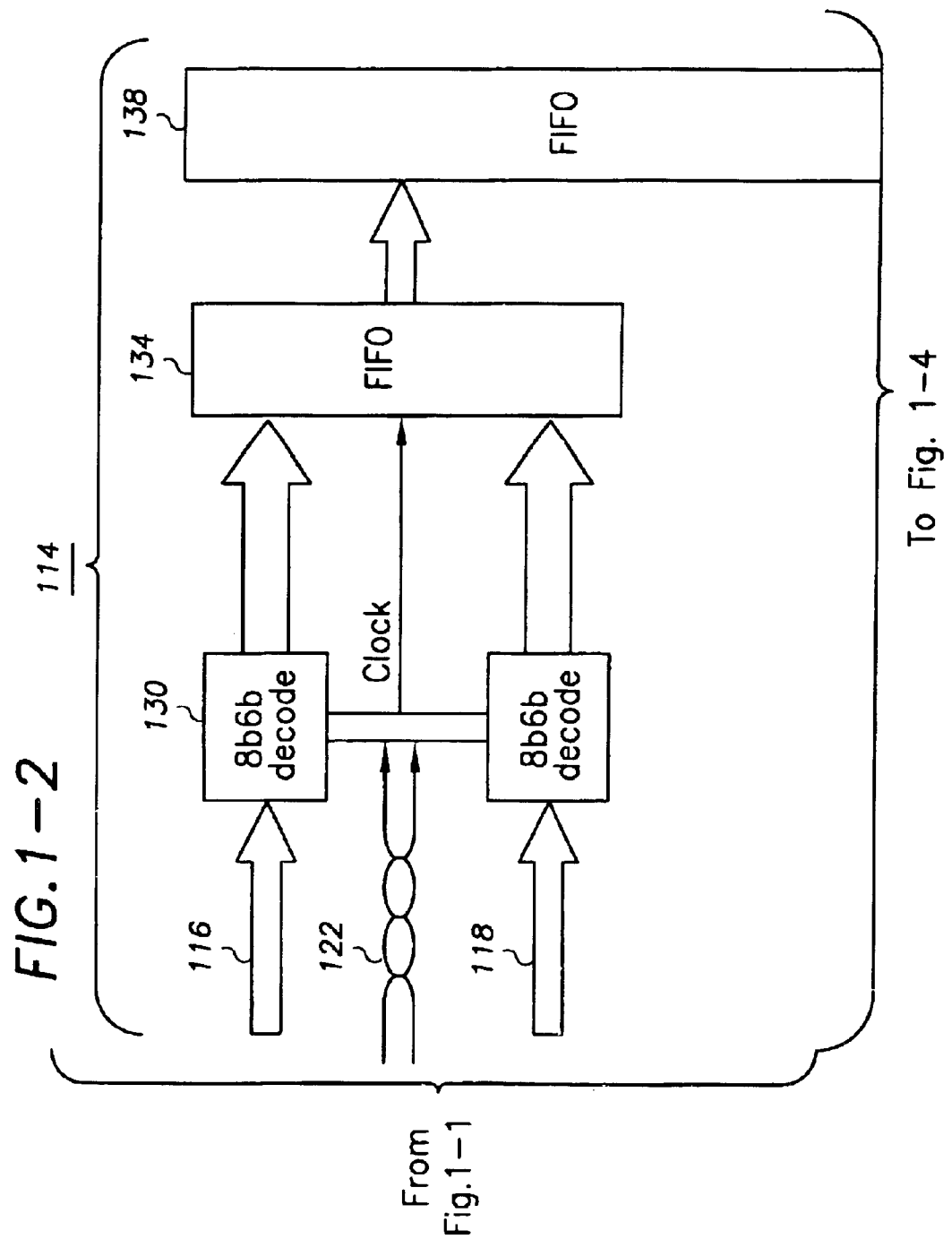
FIGS. 1—1 through 1—4 are a diagram of an example parallel data communication arrangement in which digital data is transferred in parallel from a first module to a second module over a communication channel including a plurality of parallel data-carrying lines, according to the present invention.
Figures 1, 2, 3:
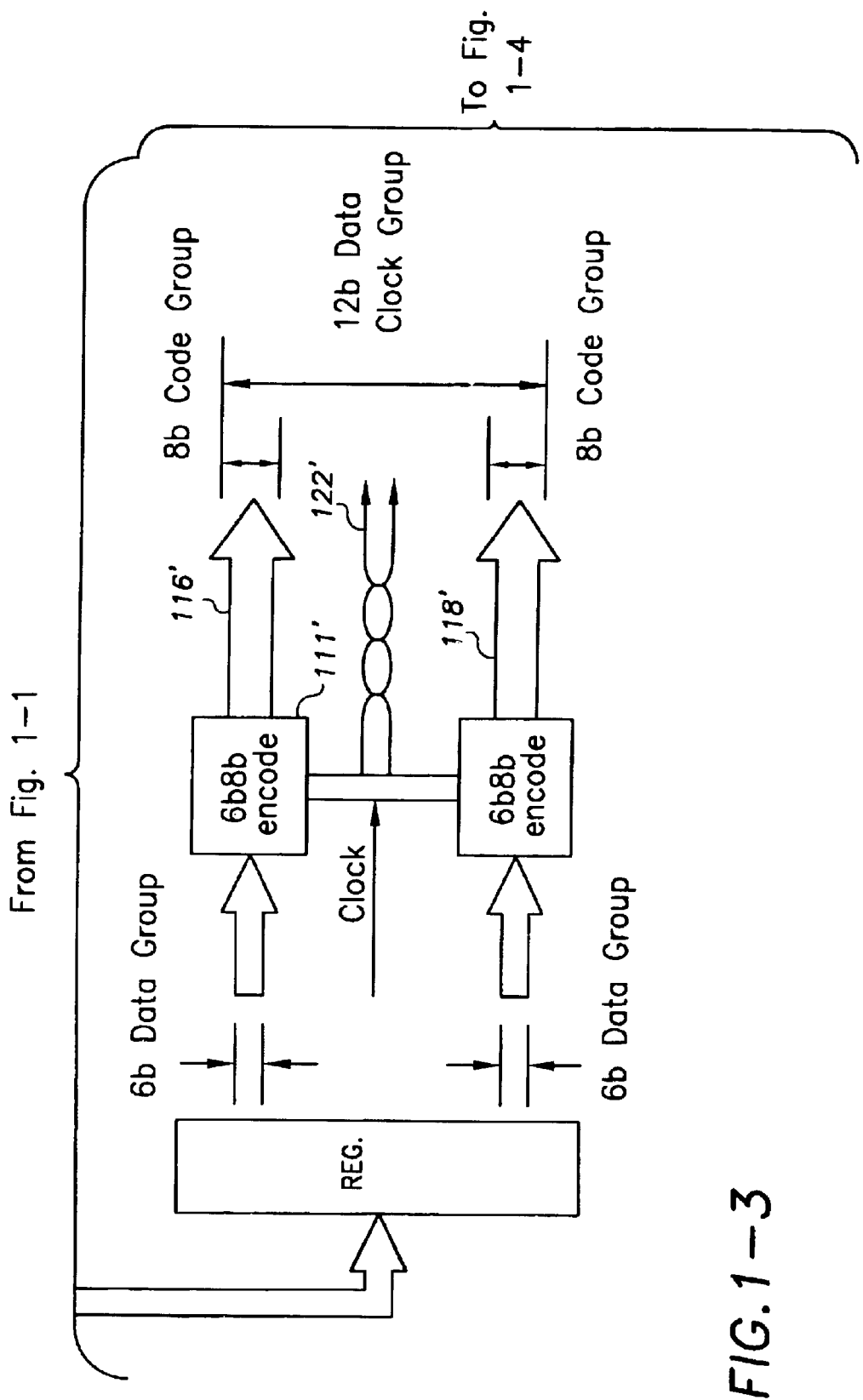
Figures 1, 2, 3, 4:
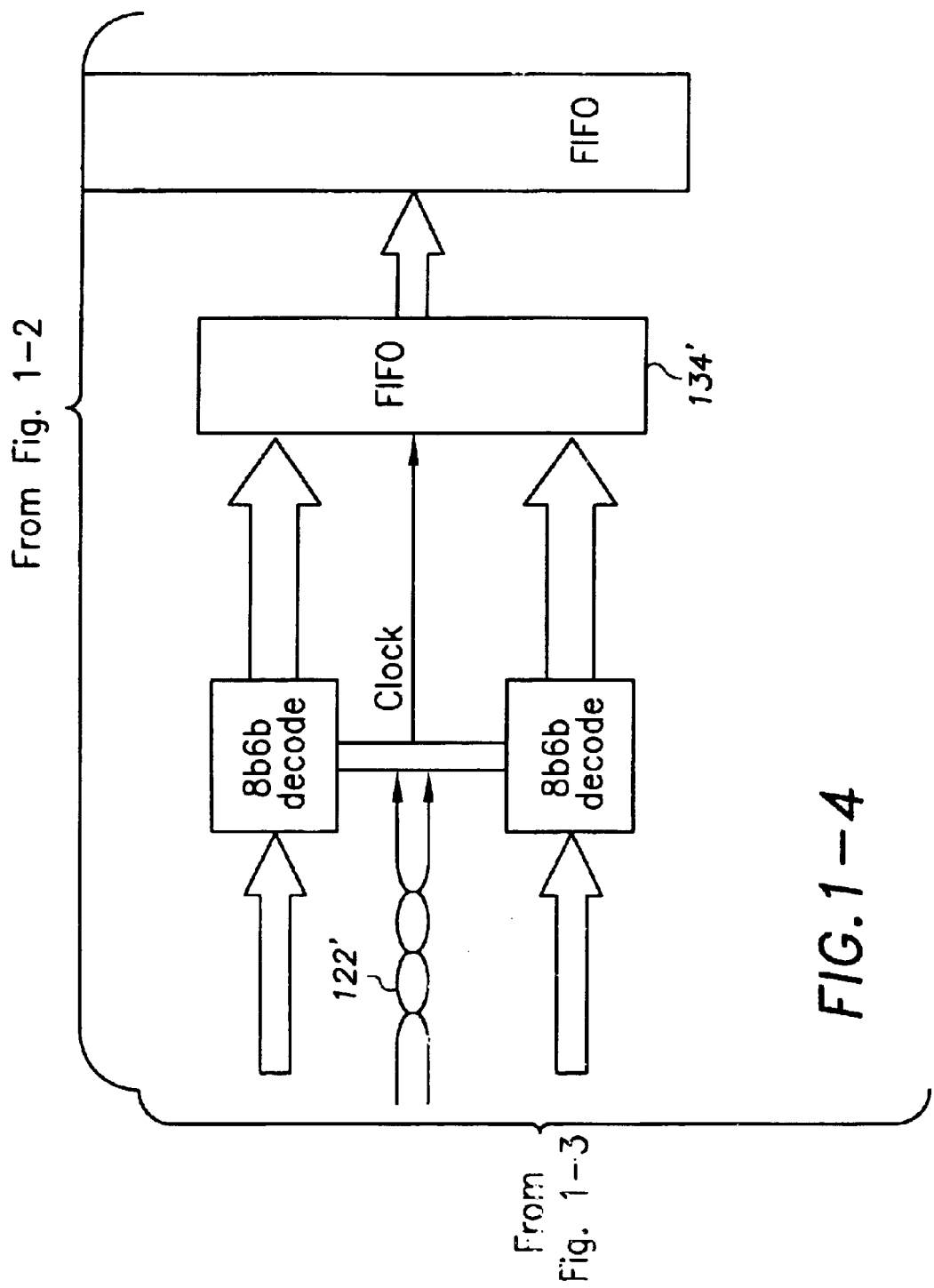

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS ILLUSTRATED EXAMPLE EMBODIMENTS

The present invention is believed to be generally applicable to methods and arrangements for transferring data between two modules (functional blocks) intercoupled by a parallel data communication path. The invention has been found to be particularly advantageous for high-speed data transfer applications susceptible to data-skew errors. Examples of such applications include, among others: SSTL (stub series transceiver/terminated logic); RSL (Rambus Signaling Logic) interfaces; closely-connected applications such as where the parallel data communication path intercouples the two modules on a single-chip; and off-board high-speed communication between chips typically situated immediately adjacent each other on the same printed circuit board. A specific example of an off-board high-speed communication between chips is described in U.S. patent application Ser. No. 09/215,942, filed on Dec. 18, 1998, now U.S. Pat. No. 6,347,395, incorporated herein by reference. While the present invention is not necessarily limited to such applications, an appreciation of various aspects of the invention is best gained through a discussion of examples in such an environment.

According to one example embodiment of the present invention, a parallel data communication arrangement passes digital data on a parallel data bus between a pair of circuit modules, referred to a sending (or first) module and a receiving (or second) module. Digital data is sent from the first module to the second module over a parallel bus that has parallel bus lines susceptible to skewing data carried by the bus. The communication arrangement is designed so that the first and second modules communicate data concurrently over the parallel bus lines in a plurality of groups. Each of the groups includes a plurality of data-carrying lines and a clock path adapted to carry a clock signal for synchronizing the digital data carried from the first module to the second module. A data processing circuit arranges the sets of data so that they are presented for transmission over the bus in these data groups. Using the clock signal, the data is sent onto the parallel bus for reception by the second module.

The second module includes a receive circuit, which may be a register or a data buffer, a data processing circuit, and a FIFO buffer for each group. Using the clock signal for the group, within each group the received digital data is synchronously received at the receive circuit and then processed and passed into the FIFO buffer. The data groupings are defined so that, once the received data is in the FIFO buffer, any skew-caused misalignments do not exceed one half clock period. In this manner, the data and the clock signal have been resolved within a single clock period.

Skew-caused misalignments between the various groups, however, have not necessarily been resolved at this point. From the FIFO buffer, the data collected for each group is further processed, for example, using another FIFO buffer that is sufficiently wide to accept the data from multiple groups (in some applications, all of the groups) for alignment and overcoming any skew at this point in the receive stage. Thus, while skew-caused misalignments before this point are not necessarily resolved, the larger FIFO can be used to resolve inter-group misalignments exceeding one half clock periods. Depending on the backend-alignment effort, in many implementations the larger FIFO can be used to resolve inter-group misalignments of multiple clock periods.

Such backend alignment can include use of various error-decoding techniques including, for example, distinguishing valid multiple-bit data values from invalid multiple-bit data values. Other approaches are described in the above-reference patent document entitled "Parallel Data Communication Having Multiple Sync Codes" (VLSI.312PA).

In an alternative embodiment for the second module, a similar approach uses additional FIFO buffers (initial FIFOs) as part of the receive circuit for each group and before the data is sent into the first-mentioned FIFO buffer for each group. In this manner, the data processing circuit has the option of using the initial FIFO to assist in the realignment of any skewed data so that any skew-caused misalignments can exceed one half clock period, with the data and the clock signal being resolved beyond a single clock period for each data group. Once the data is passed to the next FIFO for each group ("the first-mentioned FIFO buffer"), processing continues as discussed above.

FIGS. 1—1 through 1–4, collectively FIG. 1, illustrate a parallel-data communication line arrangement 100, according to another example embodiment of the present invention. The arrangement 100 includes a differential clock that is used to define the rate at which the data is synchronously passed between from a processing circuit, such as CPU 102 and registers 106, at sending module 112 to a receiving module 114. The skilled artisan will appreciate that a differential clock is not required for all applications, and that although FIG. 1 illustrates the data being passed in only one direction, reciprocal communication can also be provided with each of the modules 112 and 114 being part of a respective communication node including the reciprocal set of transmit and receive circuits.

The arrangement 100 uses a data-value encoding-decoding approach in which data values are encoded by circuit 111 and then passed, from the sending module 112 to the receiving module 114, using parallel data lines 116 and 118 along with clock lines 122 that are used to provide the communication rate and synchronization timing between sending and receiving modules 112 and 114. At the receiving module 114, a processor or other decode circuit 130 uses a reciprocal coding algorithm, lookup table or equivalent circuit to decode the data value back to its unencoded data value.

The arrangement 112 is directed to an example application involving two clock domains, each domain defined by a clock signal for synchronizing communication for a 12-bit data clock (12b DC) group corresponding to a pair of 6-bit code ("6b") groups encoded as a pair of 8-bit code ("8b") groups on bus lines 116 and 118. The first and second clock domains are respectively labeled using the same base reference numeral with the second clock domain circuitry followed by an apostrophe; for example, the differential clock of the first clock domain is denoted 122 whereas the differential clock of the second clock domain is denoted 122'. The 12b DC groups efficiently encode communications of data or commands of 12 signals. In some cases, it may be advantageous to use smaller groups. Thus, as illustrated, a 12b DC group includes a differential clock pair and two 6b8b encodes, for a total of 18 pins between the sending module 112 and the receiving module 114. For each clock domain, one half of the 12b DC group includes one 6b8b encoder and a differential clock pair, for a total of 10 pins. Un-encoded differential pairs can also be used to transport signals. These differential pairs can share the clock signal used with one half of a 12b DC group, or the differential pairs can have their own clock pair.

Data in each of the 8b code groups is synchronously received at the receiving module 114, where a data processing circuit, or in this instance an 8b6b decoder circuit 130, converts the synchronously received sets of 8-bit wide data into corresponding sets of 6-bit wide data values and then stores the 6-bit wide data values into a FIFO buffer 134 dedicated to the clock domain defined by the differential clock signal 122. Thus, for each clock domain there is one FIFO buffer immediately following a pair of 8b6b decoder circuits.

With the data groupings properly defined so that the data and the clock signal are resolved within a single clock period, the data in the FIFO buffer for each clock domain will not have any skew-caused misalignments. When FIFO 134 and FIFO 134' are not empty, the data from both are transferred to a larger FIFO 138, which is sufficiently wide to accept the data from both clock domains. A post-processor then reads this data and removes any skew-caused misalignments between the various groups.

While it will be appreciated that the XbYb (e.g., 6b8b) encode is but one of many types of bit encodes, a number of different XbYb encoding approaches can be used, examples of which are provided using the 6b8b type of bit encode in the above-referenced patent document entitled "Parallel Communication Based On Balanced Data-Bit Encoding" (VLSI.295PA). This above-referenced patent document also illustrates and describes termination approaches useful in connection with the bus lines discussed herein.

FIGS. 2—1 through 2–2, collectively FIG. 2, illustrate another implementation of the present invention in which six of the same types of encode/decode clock domain circuits of FIG. 1 are used in each of two communication paths for communication in each respective direction. For passing communications initiated at a first terminal 210 for reception at the second terminal 212, one of the six identical clock domain circuits is depicted by connected circuits 216a and 216b. For communications initiated at the second terminal 212 for reception at the first terminal 210, six additional encode/decode clock domain circuits of this type are used; one of these circuits is depicted by connected circuits 236a and 236b. For the sake of brevity, the following discussion is limited to the communication flow initiated at the first terminal 210 for reception at the second terminal 212.

Communications initiated at a first terminal 210 begin at CPU 240, or another source, which feeds target data, along with any desired status or control data, to a front-end FIFO 242. From the FIFO 242, the data is formatted for communication at flow-control buffer 244 for presentation to the six sets of encode/decode clock domain circuits(depicted as 245); thus, the encode/decode clock domain circuits receive data that is 72 bits wide (twelve bits for each of the six domain circuits). After 6b8b encoding, the data is transmitted to and decoded at the second terminal 212 as previously described. Once decoded, the data is presented to the wide FIFO 246 and, with skew-caused misalignments being corrected, then packed into a FIFO 250 for processing by the second terminal CPU 260.

Also illustrated in FIG. 2 are flow-control communication paths 270 and 272. These paths 270 and 272 are used to provide status information back to the initiating terminal 210 or 212. Various types of communication status information can be provided depending on the application; examples include whether the FIFO is filled less than a lower threshold level, whether the FIFO is filled more than an upper threshold level, whether the FIFO is empty, whether the FIFO is full, whether an error has occurred due, for example, to the FIFO overflowing or invalid data being drawn from the FIFO. Such flow control is conventional and used in many communication schemes.

The skilled artisan will further recognize that the flow-control communication paths 270 and 272 can be implemented using any of a variety of different types of connections, including slower-speed connections such as single-ended, non-clocked signalling.

For the arrangement of FIG. 2, the timing relationship between the codes transmitted over the parallel bus and the differential clock is based on source synchronous timing, with register-to-register transfers used to simplify the timing process. For flow control, it is also advantageous to specify skew for data recovery, packet synchronization and maximum flight time.

In the "tunnel" (between transmitting and receiving terminals), code strobes are centered in the code window which allows the data to be clocked in by using both edges of the clock. A single TC differential clock pair provides a rise and a fall per clock period. However, these signals are not used to clock the data until they have passed a differential receiver.

For the arrangement of FIG. 2, the timing at the receiving pins of a tunnel chip (not shown) can be referenced at the intersection of the two strobes. The code is not sampled by using both code strobes (thereby providing a rising edge for each code window); rather, in this example, the code strobes are received by a differential receiver and the required clocks are generated from the single differential reference.

Accordingly, various embodiments have been described as example implementations of the present invention for addressing skew issues in parallel bus applications. In each such implementation, skew across clock-domain groups is tolerated and overcome by processing the data and the skew first within each clock domain group, and then between groups.

The present invention should not be considered limited to the particular examples described above. Various modifications, equivalent processes, as well as numerous structures to which the present invention may be applicable fall within the scope of the present invention. For example, multi-chip or single-chip arrangements can be implemented using a similarly constructed one-way or two-way interface for communication between the chip-set arrangements. Such variations may be considered as part of the claimed invention, as fairly set forth in the appended claims.

What is claimed is:

1. A parallel data communication arrangement susceptible to skewing data, comprising:
   a parallel bus having parallel bus lines adapted to transfer digital data, the parallel bus lines being arranged in a plurality of groups wherein each group includes a plurality of data-carrying lines and a clock path adapted to carry a clock signal for synchronizing digital data carried over the plurality of data-carrying lines of the group;
   a first module adapted to transfer sets of data concurrently on the plurality of groups of lines of the parallel bus; and
   a second module adapted to collect, for each group, the digital data carried from the first module over the plurality of data-carrying lines as synchronized by the clock signal for the group and adapted to align the data collected for each group and overcome any skew-caused misalignments between data concurrently transferred in different groups.

2. The parallel data communication arrangement of claim 1, wherein for each group the clock path is implemented using a pair of the parallel bus lines, the pair of the parallel bus lines adapted to carry the clock signal as a differential signal.

3. The parallel data communication arrangement of claim 2, wherein for each group, data carried by the plurality of data-carrying lines are synchronized by the differential clock signal to tolerate any skew-caused misalignments between data concurrently transferred in the group, the skew-caused misalignments not exceeding one half clock period.

4. The parallel data communication arrangement of claim 1, wherein for each group, data carried by the plurality of data-carrying lines are synchronized by the clock signal to tolerate any skew-caused misalignments between data concurrently transferred in the group, the skew-caused misalignments not exceeding one half clock period.

5. The parallel data communication arrangement of claim 1, wherein the clock signal is a differential clock signal, and the first and second modules are further adapted to process concurrent data to permit the second module to resolve for each group, data carried by the plurality of data-carrying lines and the differential clock signal within a single clock period of the clock signal, thereby tolerating a certain degree of skew-caused misalignments.

6. The parallel data communication arrangement of claim 1, wherein the first and second modules are further adapted to process concurrent data to permit for the second module to resolve for each group, data carried by the plurality of data-carrying lines and the differential clock signal within a single clock period of the clock signal, and, between data concurrently transferred in different groups, to permit skew-caused misalignments that exceed one-half clock period.

7. The parallel data communication arrangement of claim 1, wherein the data carried over the plurality of data-carrying lines is encoded, and wherein the second module includes for each group: a receiver circuit responsive to the clock signal and adapted to receive the digital data carried from the first module over the plurality of data-carrying lines, a data decoder adapted to decode the received digital data; and a FIFO buffer adapted for storing the decoded data.

8. The parallel data communication arrangement of claim 1, wherein for each group, the data decoder converts an X-bit value to a Y-bit value, where X and Y are positive integers and X is greater than Y, and wherein the Y-bit value is stored in the FIFO buffer.

9. The parallel data communication arrangement of claim 1, wherein for each group, the clock signal is used to synchronize the reception of two sets of multiple-bit data values at the receiver circuit.

10. The parallel data communication arrangement of claim 1, wherein for each group, the clock signal is used to synchronize the reception of two sets of encoded multiple-bit data values at the receiver circuit, and wherein the second module includes for each group: a data decoder adapted to decode the multiple-bit data values, and a FIFO buffer adapted to store the decoded data.

11. The parallel data communication arrangement of claim 10, wherein for each group, the data decoder converts an 8-bit value to a 6-bit value, and wherein the 6-bit value is stored in the FIFO buffer.

12. The parallel data communication arrangement of claim 10, wherein the second module further includes data processing circuitry and another FIFO buffer, the data processing circuitry and the other FIFO buffer adapted to collect the decoded data from the FIFO buffers of the respective groups, and wherein the data collected for each group is aligned after being stored in the other FIFO buffer.

13. The parallel data communication arrangement of claim 12, wherein the second module is further adapted to align the data by processing the stored multiple-bit data values, said processing including distinguishing valid multiple-bit data values from invalid multiple-bit data values.

14. The parallel data communication arrangement of claim 10, further including a feedback communication path adapted to feed information from the second module to the first module, the information indicating at least one of: an error signal indicating that too much data has been sent; and a warning signal indicating that ongoing communication is approaching a near-full condition.

15. The parallel data communication arrangement of claim 1, wherein the first module and the second module include respective circuitries for processing data over another parallel data bus for data transferred from the second module to the first module, the respective circuitries including operations that are reciprocal relative to data transferred from the first module to the second module.

16. A parallel data communication arrangement susceptible to skewing data, comprising:

a parallel bus having parallel bus lines adapted to transfer digital data, the parallel bus lines being arranged in a plurality of groups wherein each group includes a plurality of data-carrying lines and a clock path adapted to carry a clock signal for synchronizing digital data carried over the plurality of data-carrying lines of the group;

a first module including data processing circuitry adapted to arrange and encode data values to be transferred over the parallel bus and including driver circuits adapted to transfer sets of data concurrently on the plurality of groups of lines of the parallel bus; and a second module including data processing circuitry adapted to receive and decode data values transferred from the first module over the parallel bus, the processing circuitry including a plurality of FIFO buffers each respectively assigned to one of the plurality of groups, and each FIFO buffer being adapted to collect for each group the digital data carried over the plurality of data-carrying lines as synchronized by the group clock signal, and the processing circuitry being adapted to align the data collected for each group and overcome any skew-caused misalignments between data concurrently transferred in different groups.

17. The parallel data communication arrangement of claim 16, wherein the first module and the second module include respective circuitries for processing data over another parallel data bus for data transferred from the second module to the first module, the respective circuitries including operations that are reciprocal relative to data transferred from the first module to the second module.

18. The parallel data communication arrangement of claim 16, wherein for each group, the clock signal is differential and is used to synchronize the reception of two sets of encoded multiple-bit data values at the receiver circuit, and wherein the second module includes for each group: a data decoder adapted to decode the multiple-bit data values, and a FIFO buffer adapted to store the decoded data, and wherein the second module further includes data processing circuitry and another FIFO buffer, the data processing circuitry and the other FIFO buffer adapted to collect the decoded data from the FIFO buffers of the respective groups, and wherein the data collected for each group is aligned after being stored in the other FIFO buffer.

19. The parallel data communication arrangement of claim 18, wherein the second module is further adapted to align the data by processing the stored multiple-bit data values, said processing including distinguishing valid multiple-bit data values from invalid multiple-bit data values.

20. A parallel data communication arrangement susceptible to skewing data, comprising:

a parallel bus having parallel bus lines adapted to transfer digital data, the parallel bus lines being arranged in a plurality of groups wherein each group includes a plurality of data-carrying lines and a clock path adapted to carry a clock signal for synchronizing digital data carried over the plurality of data-carrying lines of the group;

first means for transferring sets of data concurrently on the plurality of groups of lines of the parallel bus; and second means for collecting, for each group, the digital data carried from the first means over the plurality of data-carrying lines as synchronized by the clock signal for the group and for aligning the data collected for each group and overcoming any skew-caused misalignments between data concurrently transferred in different groups.

21. A method of transferring digital data from a first module to a second module over a parallel bus having parallel bus lines susceptible to skewing data carried by the bus, the method comprising:

arranging the parallel bus lines in a plurality of groups, each of the groups including a plurality of data-carrying lines and a clock path adapted to carry a clock signal for synchronizing digital data carried from the first module to the second module over the plurality of data-carrying lines of the group;

transferring sets of data concurrently using the groups of lines of the parallel bus;

at the second module and for each group, collecting the digital data carried from the first module over the plurality of data-carrying lines as synchronized by the clock signal for the group; and at the second module, aligning the data collected for each group and overcoming any skew-caused misalignments between data concurrently transferred in different groups.

* * * * *